United States Patent [19]

Long

[11] 4,248,772
[45] Feb. 3, 1981

[54] POSITIVELY OR NEGATIVELY CHARGED AZO COMPOUNDS CONTAINING A BALLASTING GROUP

[75] Inventor: William E. Long, Brentwood, England

[73] Assignee: Ciba-Geigy AG, Basel, Switzerland

[21] Appl. No.: 14,777

[22] Filed: Feb. 23, 1979

[30] Foreign Application Priority Data

Oct. 30, 1978 [GB] United Kingdom ............... 42414/78

[51] Int. Cl.³ ...................... C09B 29/20; C09B 45/04; C09B 45/08; C09B 45/18
[52] U.S. Cl. ................. 260/146 R; 430/226; 260/146 D; 260/147; 260/152; 260/154; 260/155; 260/156; 260/163; 260/197; 260/198; 260/199; 260/200; 260/202; 260/203; 260/204; 260/143
[58] Field of Search ........... 260/146 R, 146 D, 146 T, 260/147, 152, 154, 155, 156, 157, 158, 163, 197, 198, 199, 200, 203, 204, 143

[56] References Cited

U.S. PATENT DOCUMENTS

| | | | |
|---|---|---|---|
| 2,104,357 | 1/1938 | Straub et al. | 260/145 B |
| 2,150,741 | 3/1949 | Harrison et al. | 260/314 |
| 2,841,576 | 7/1958 | Zickendraht et al. | 260/145 A |
| 3,406,162 | 10/1968 | Neier et al. | 260/151 X |
| 3,597,244 | 8/1971 | Fookson et al. | 106/22 |
| 3,600,373 | 8/1971 | Zickendraht et al. | 260/146 R |
| 3,928,312 | 12/1975 | Fleckenstein | 260/156 |

FOREIGN PATENT DOCUMENTS

| | | | |
|---|---|---|---|
| 555410 | 8/1943 | United Kingdom | 260/162 |
| 853985 | 11/1960 | United Kingdom | 260/158 |
| 882837 | 11/1961 | United Kingdom | 260/208 |
| 1076110 | 7/1967 | United Kingdom | 260/208 |

*Primary Examiner*—Floyd D. Higel
*Attorney, Agent, or Firm*—Sprung, Felfe, Horn, Lynch & Kramer

[57] ABSTRACT

Novel azo compounds of the general formula

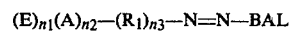

$(E)_{n_1}(A)_{n_2}-(R_1)_{n_3}-N=N-BAL$ are provided, wherein A is a charged group which may be positively or negatively charged, E is a counter ion which carries a charge of opposite sign to that carried by A, BAL represents a ballasting group attached to the azo group via an aromatic or heterocyclic ring which may be further substituted, and $R_1$ is an optionally substituted aromatic or heterocyclic ring which is present unless A is a charged heterocylic group, and $n_1$ and $n_2$ are each 1 or 2, and $n_3$ is 0 or 1.

The compounds are useful in the photographic field, especially in the photographic dye diffusion transfer process for the production of photographic images.

15 Claims, No Drawings

POSITIVELY OR NEGATIVELY CHARGED AZO COMPOUNDS CONTAINING A BALLASTING GROUP

This invention relates to novel azo compounds and to a method for their manufacture.

According to the present invention there are provided azo compounds of the general formula $$(E)_{n1}(A)_{n2}—(R_1)_{n3}—N=N—BAL \quad (1)$$

where A is a charged group which may be positively or negatively charged, E is a counter ion which carries a charge of opposite sign to that carried by A, BAL represents a ballasting group attached to the azo group via an aromatic or heterocyclic ring which may be further substituted, and $R_1$ is an optionally substituted aromatic or heterocyclic ring which is present unless A is a charged heterocyclic group, $n_1$ and $n_2$ are each 1 or 2 and $n_3$ is 0 or 1.

The substituents in $R_1$ may be alkyl or alkoxy of 1 to 4 carbon atoms, halogen (fluorine, chlorine, bromine) or hydroxyl. The aromatic ring preferably is phenyl or naphthyl, the heterocyclic ring e.g. pyridinyl.

Compounds of formula (1) of particular interest are compounds of formula $$(D)_{n1}(A)_{n2}—(R_1)_{n3}—N=N—BAL \quad (2)$$

where A, $R_1$, $n_1$, $n_2$, $n_3$ and BAL have the meanings assigned to them above and D is the residue of a diffusible dye which carries a charge opposite in sign to the charge carried by A.

Examples of group A which are positively charged are a quaternary ammonium group, a quaternary phosphonium or arsonium group and a guanidinium group.

Examples of group A which are negatively charged are a sulphonic acid anion group, a phosphoric acid anion group and an alkyl sulphate group.

A particularly useful BAL group is the group of formula (3)

[Structure: naphthalene with —OH and —CONHR$_2$ substituents]

where $R_2$ is either an alkyl group containing at least 10 carbon atoms or is a group containing such a group or is an aryl ballasting group.

An example of an aryl ballasting group is the group of formula (4)

[Structure: —(CH$_2$)$_4$O—phenyl with two t-amyl substituents]

Examples of suitable classes of dyes for the residue D are phthalocyanines, anthraquinones and azines, including oxazines and thiazines, and acridines. Also indigo dyes, oxonols, pyrylium dyes, azo and azoxy dyes are useful.

When A in formula (2) is anionic the compounds of formula (2) may be prepared from compounds of formula $$M^{\oplus\ominus}(A)_{n2}—R_1—N=N—BAL \quad (5)$$

where A, $R_1$, BAL and $n_2$ have the meanings assigned to them above and $M^\oplus$ is a cation, e.g. an alkali metal cation by reaction with a cationic or basic dye such as those described in the Colour Index (published by the Society of Dyers and Colorists).

Mixed solutions of a suitable cationic or basic dye and a compound of formula (5) result in a precipitation of a compound of formula (2). The precipitated compound can then be purified. Alternatively the mixed solution may be an aqueous gelatin solution and in this case a gelatin suspension of the compound of formula (2) is produced which can then be added to a photographic coating solution to coat onto a film base.

However the compounds of formula (2) may be prepared in situ in a coated gelatin layer. In this case a gelatin coating which comprises a compound of formula (5) is prepared and a solution of a cationic dye applied thereto. A compound of formula (2) is then produced in situ in the coated gelatin layer.

In similar manner when A is cationic compounds of formula (2) may be prepared from compounds of formula $$X_{n1}^{\ominus\oplus}(A)_{n2}—(R_1)_{n3}—N=N—BAL \quad (6)$$

where A, $R_1$, BAL, $n_1$, $n_2$ and $n_3$ have the meanings assigned to them above and $X^\ominus$ is an anion, using soluble anionic or acid dyes such as those listed in the Colour Index.

Compounds of formula (5) may be prepared by diazotising a compound of formula $$H_{n1}(A)_{n2}—R_1—NH_2 \quad (7)$$

when A, $R_1$, $n_1$ and $n_2$ have the meanings assigned to them above to yield a compound of formula $$H_{n1}(A_{n2})—R_1—N_2^\oplus \quad (8)$$

and the coupling this diazo compound with a coupler BAL$^\ominus$ M$^\oplus$ where BAL is as defined above and M$^\oplus$ is a cation.

A particularly useful compound of formula (5) is the compound of formula (9)

[Structure: H$^\oplus\ominus$SO$_3$—phenyl—N=N—BAL]

where BAL is as defined above.

Most preferably BAL has the formula

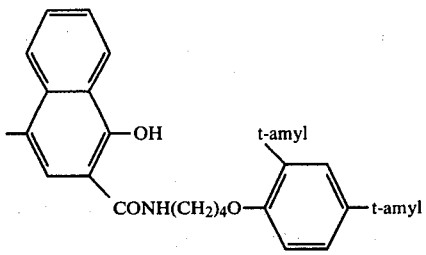

(10)

Suitable basic dyes for the preparation of the compound of formula (2) are basic dyes of the general formula

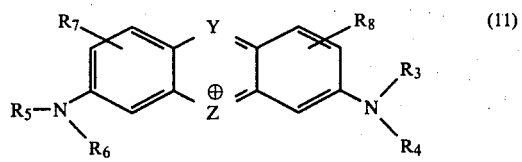

(11)

where Y is N or $CR_9$ and Z is $S^\oplus$, $O^\oplus$ or $—N^\oplus R_{10}$ and each of $R_3–R_{10}$ are hydrogen atoms, alkyl of 1 to 4 carbon atoms, preferably methyl or ethyl, or an aromatic or substituted aromatic group, or $R_5$ and $R_6$ may together with the nitrogen atom form a heterocyclic ring, or $R_7$ and $R_8$ may represent annelation of the ring to which they are attached. The aromatic group is preferably phenyl, optionally substituted by alkyl of 1 to 4 carbon atoms, halogen (chlorine, bromine) hydroxy or carboxyl. Preferably the heterocyclic ring which is formed by $R_5$ and $R_6$ together with the nitrogen atom is 5- or 6-membered. The annelated rings of $R_7$ and $R_8$ are preferably benzene rings, optionally further substituted by the substituents mentioned above for phenyl. Preferably most of the $R_5$ to $R_{10}$ are hydrogen atoms to ensure that the basic dye is diffusible.

Compounds of formula (11) wherein Y is N and Z is $NR^\oplus_{10}$ are phenazine compounds.

Particularly suitable phenazine compounds of formula (11) are phenazines of formula

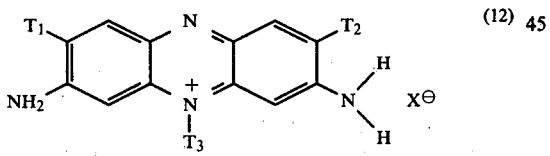

(12)

where $T_1$ and $T_2$ are hydrogen atoms or substituents and in particular methyl and $T_3$ is a phenyl or alkyl group e.g. of 1 to 4 carbon atoms and $X^\ominus$ is an anion. Preferably $T_3$ is a phenyl group. When the dye is liberated a diffusible magenta phenazine dye is released.

An example of such a phenazine compound is the compound of formula

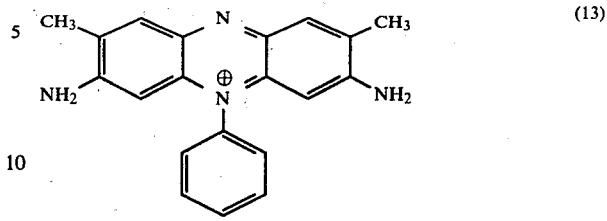

(13)

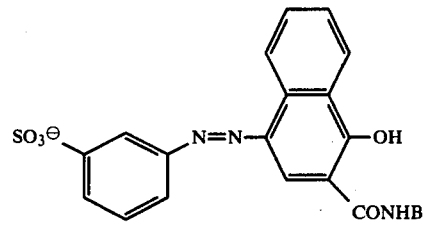

where B is the group

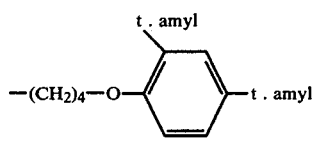

When the azo link is cleaved a magenta dye is liberated.

Compounds of formula (11) wherein Y is N and Z is $O^\oplus$ are oxazine compounds.

Particularly suitable oxazine compounds of formula (11) are oxazine compounds of formula

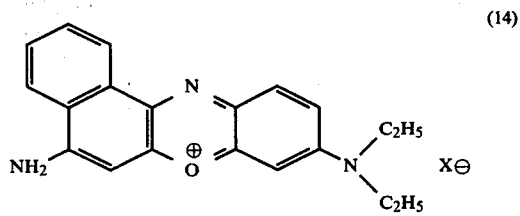

(14)

where $X^\ominus$ is an anion.

An example of such an oxazine compound of formula (2) is the compound of formula

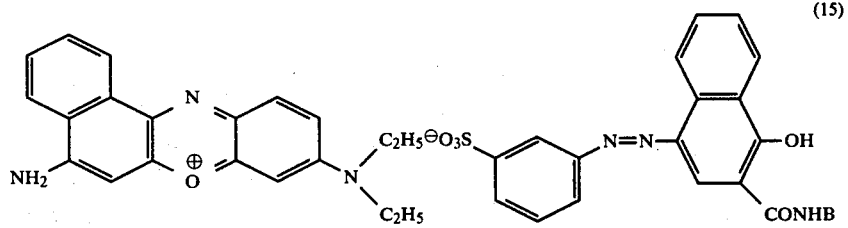

(15)

where B is the group as defined above.

When the azo link is cleaved a diffusible bluish dye is obtained.

Compounds of formula (11) where Y is N and Z is $S^\oplus$ are thiazine compounds.

Particularly suitable thiazine compounds are those of formula

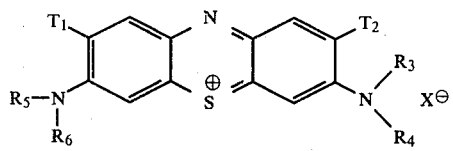

(16)

where $T_1$, $T_2$, $X^\ominus$, $R_3$, $R_4$, $R_5$ and $R_6$ have the meanings assigned to them above.

An example of such a thiazine compound of formula (2) is the compound of formula

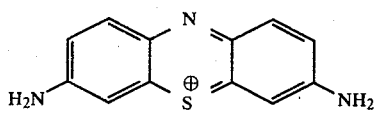

(17)

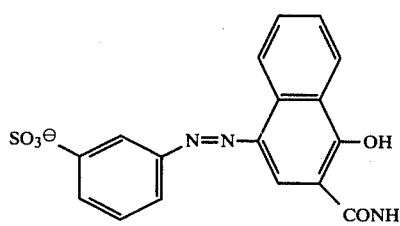

where B has the meaning assigned to it above.

When the azo link is cleaved a blue dye is released.

Compounds of formula (11) where Y is $CR_9$ and Z is $N^\oplus R_{10}$ are acridine compounds.

Particularly suitable acridine compounds are those of formula

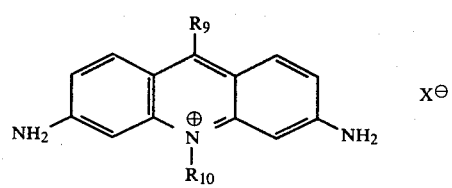

(18)

where Z, $R_9$, $R_{10}$ and $X^\ominus$ have the meanings assigned to them above.

An example of such an acridine compound of formula (2) is the compound of formula

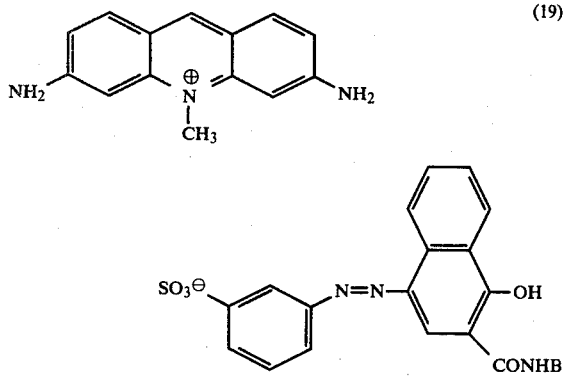

(19)

where B has the meaning assigned to it before.

When the azo linkage is cleaved a diffusible yellow acridine dye is released.

Compounds of formula (11) where Y is $CR_9$ and Z is $O^\oplus$ are pyrylium compounds.

Particularly suitable pyrylium compounds are compounds of formula

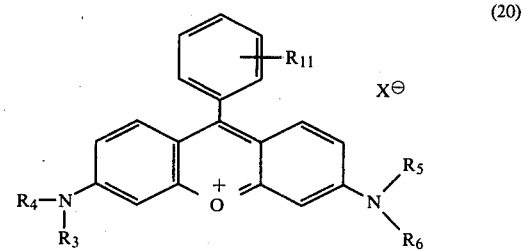

(20)

where $R_3$, $R_4$, $R_5$, $R_6$ and $X^\ominus$ have the meanings assigned to them above and $R_{11}$ is a substituent such as e.g. alkyl of 1 to 4 carbon atoms, halogen, hydroxy or carboxyl.

An example of a rhodamine compound of formula (2) is the compound of formula

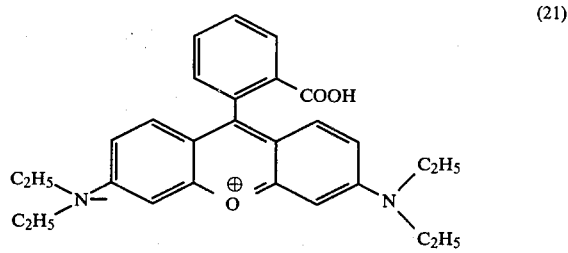

(21)

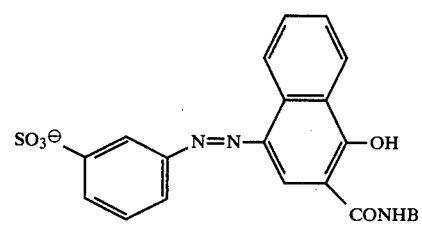

where B is as defined above.

When the azo linkage of dye (21) is cleaved a magenta diffusible rhodamine dye is released.

Another class of basic dyes suitable for the preparation of the compounds of formula (2) are basic anthraquinone dyes of the general formula

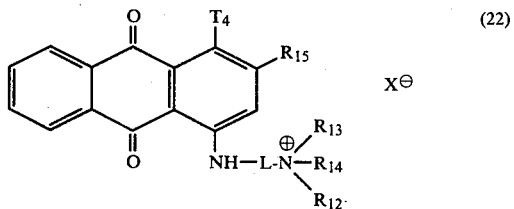

(22)

where $T_4$ is a hydrogen atom, a hydroxy or alkoxy group, or an amino or substituted amino group, $R_{15}$ is hydrogen, halogen, alkoxy, amino or substituted amino or a group conferring solubility in water, $R_{12}$, $R_{13}$ and $R_{14}$ are alkyl or aromtic groups, L is a suitable linking group and $X^\ominus$ is an anion. It is to be understood that further substitution may be present in the anthraquinone nucleus, particularly in the ring which is not already substituted. Alternatively $R_{12}$, $R_{13}$ and $R_{14}$ may comprise a ring system or systems.

$R_{12}$, $R_{13}$ and $R_{14}$ are e.g. alkyl of 1 to 4 carbon atoms or optionally substituted phenyl, the substituents being e.g. alkyl or alkoxy of 1 to 4 carbon atoms, halogen or hydroxy. $R_{15}$ is for example hydrogen, halogen (chlorine, bromine), alkoxy of 1 to 4 carbon atoms, amino, mono- or dialkyl amino (alkyl of 1 to 4 carbon atoms), further —COOH or —SO$_3$H. L is for example alkylen (—CH$_2$—)$_p$ wherein p is 1 to 10, preferably 1 to 4, $T_4$ is hydrogen, hydroxy, alkoxy of 1 to 4 carbon atoms, especially methoxy, amino (—NH$_2$) or mono- or dialkyl (C$_1$-C$_4$)-amino.

An example of such anthraquinone compound of formula (2) is the compound of formula

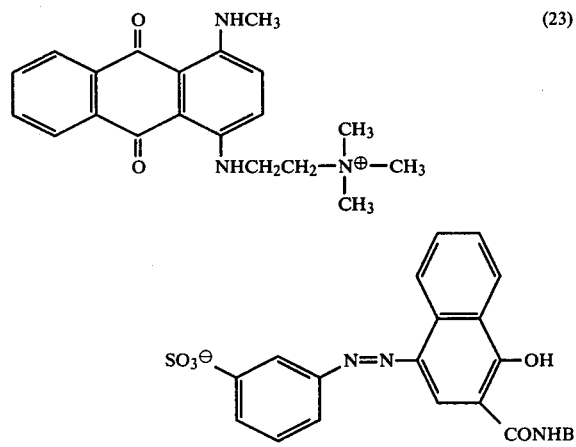
(23)

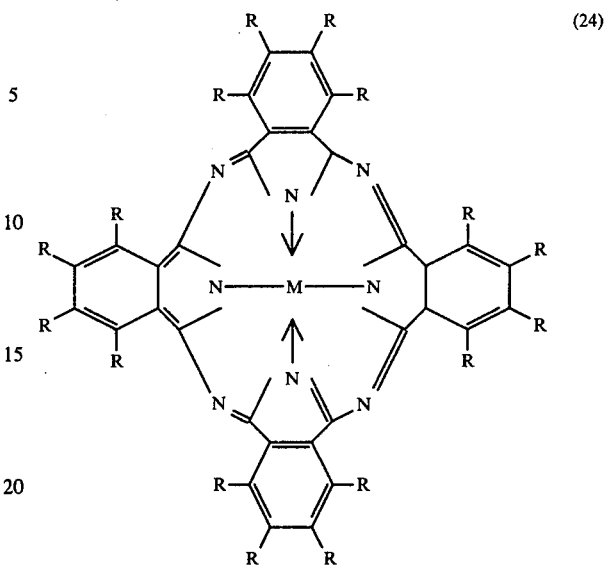
(24)

where M represents a metal which may or may not be present and each R can be hydrogen, SO$_3$H, SO$_3$W where W is a cation, preferably an alkali metal cation, and at least one R has the formula L-N$^\oplus$R$_{12}$R$_{13}$R$_{14}$ where L, R$_{12}$, R$_{13}$, R$_{14}$ have the meanings assigned to them above.

M may be iron, cobalt, nickel, magnesium, manganese, barium or zinc and is preferably copper. An example of such a phthalocyanine compound of formula (2) is the compound of formula

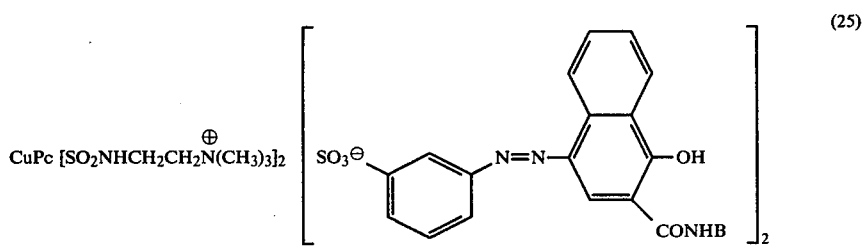
(25)

where B has the meaning assigned to it above, and Pc represents the phthalocyanine nucleus of formula (24).

Compounds of formula (6) may be prepared by diazotising an amine of formula A-NH$_2$ where A is either a heterocyclic ring which can be quaternised or represents either an aromatic or heterocyclic ring to which is attached a group which can be converted to a cationic group, and then coupling the resultant diazonium compound of the formula A-N$\equiv$N$^\oplus$ with a coupler of the formula M$^\oplus$ BAL$^\ominus$ where M and BAL have the meanings assigned to them above and then forming the cationic compound by reaction with a quaternising agent, e.g. methyl iodide.

An example of such a reaction is when A is where B has the meaning assigned to it above.

Another class of cationic dyes which are suitable for the preparation of the compounds of formula (2) is cationic phthalocyanine dyes.

A phthalocyanine complex can be shown as formula

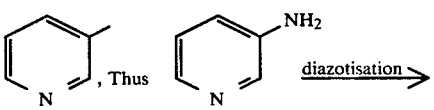

-continued

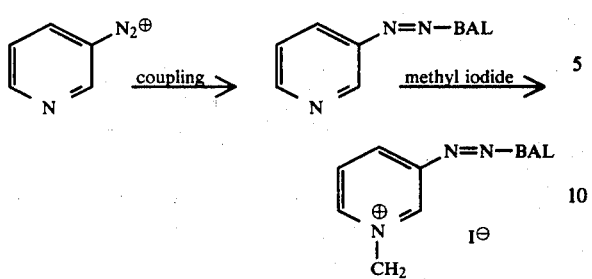
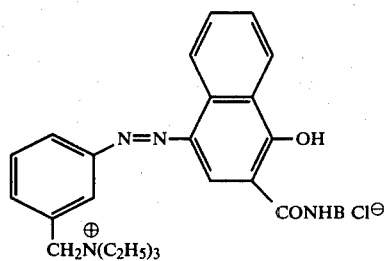

An example of such a compound is the compound of formula

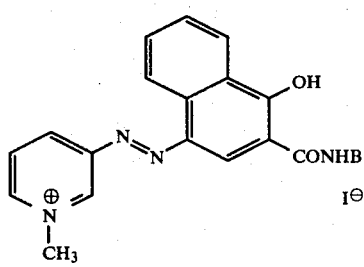

(26)

where B has the meaning assigned to it above.

An example of a group A which can be converted to a cationic group is the group of formula (27)

[structure with CH$_2$OH]

which may be converted to quaternary ammonium groups, phosphonium or arsonium groups by reaction with p-toluene-sulphonyl chloride and an amine or phosphine or arsine, thus:

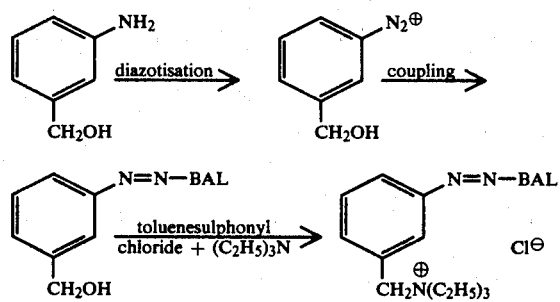

An example of such a compound is the compound of formula (28)

[structure with N=N, OH, CONHB Cl$^\ominus$, CH$_2$N(C$_2$H$_5$)$_3$]

where B has the meaning assigned to it above.

Diamines of the formula NH$_2$—F—NH$_2$ where F is a linking group are also of use as they can be converted to guanidinium compounds. For example:

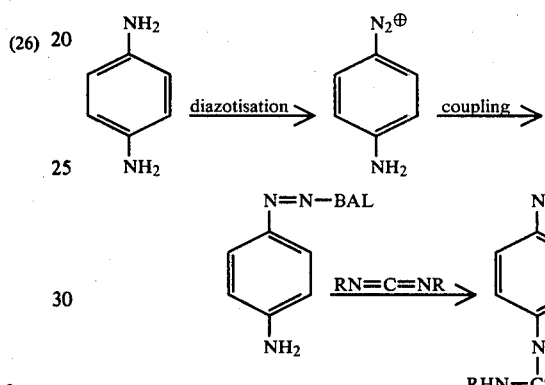

where R is hydrogen or alkyl, e.g. of 1 to 6 carbon atoms or cycloalkyl of 5 or 6 carbon atoms, for example cyclohexyl.

An example of such a compound is the compound of formula (29)

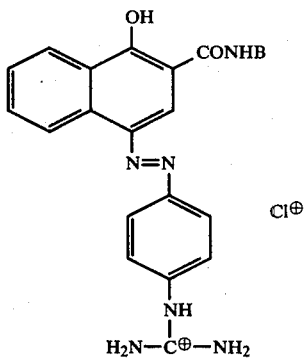

where B has the meaning assigned to it above.

Suitable dyes for the formation of compounds of formula (2) where A carries a positive charge include dyes of the azo, anthraquinone and phthalocyanine classes.

However when A is an azo dye it is important that its azo linkage is less readily cleaved than the azo linkage —R$_1$—N=N—BAL shown in formula (2). Usually the group R$_1$ renders the azo link to which it is attached more readily cleaved by the reducing compound than the azo group in the azo dye. Nevertheless it is preferred to stabilise the azo group in the azo dye by attaching the azo group in the azo dye to a group which comprises an active methylene group.

Examples of groups which comprise an active methylene group are pyrazolones, hydroxypyridones and the ketomethylene group —CO—CH$_2$—CO—. A suitable azo dye has the structure

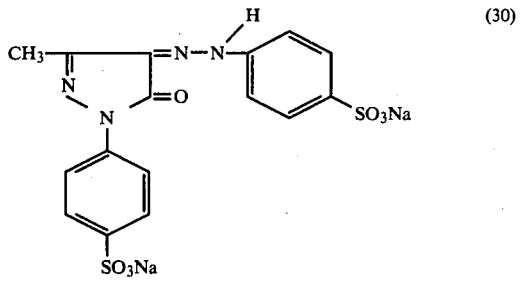 (30)

Thus the compound of formula (2) made using the compounds of formula (26) and formula (30) is of the formula

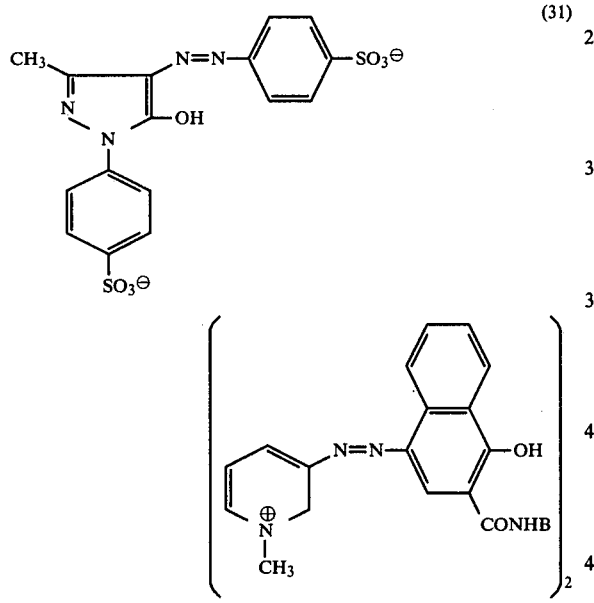 (31)

An example of such a phthalocyanine complex is the compound of formula

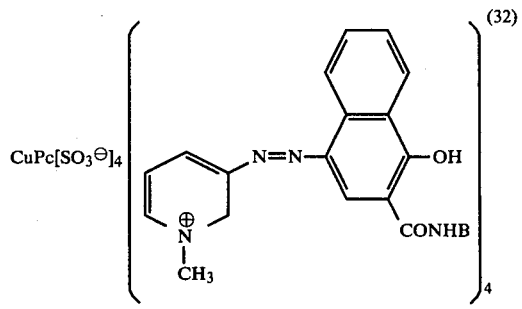 (32)

where Pc is the complex of formula (24) and four of R groups are SO$_3$⊖. B has the meaning indicated above.

Thus formula (2) covers two pairs of groups. These are

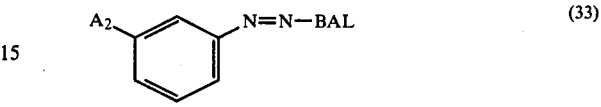

Examples of D⊕ are the tricyclic basic dyes of formula (11), the basic anthraquinone dyes of general formula (22) and the phthalocyanine dye complexes of formula (24).

Most preferably the group ⊖A—(R$_1$)$_{n3}$—N=N—BAL is of the general formula

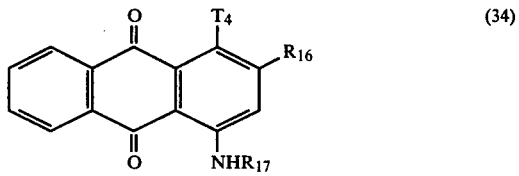 (33)

where A$_2$ is —SO$_3$⊖, —CH$_2$SO$_4$⊖ or —HPO$_4$⊖ and BAL has the meaning assigned to it above. Most preferably BAL is the group of formula (10). Most preferably A$_2$ is —SO$_3$⊖.

Examples of D⊖ are azo dyes which carry a negative charge, anthraquinone dyes which carry a negative charge and phthalocyanine dyes which carry a negative charge. Often the negative charge is a —SO$_3$⊖, —CH$_2$SO$_4$⊖, or —HPO$_4$⊖ substituent.

Anthraquinone dyes are for example of the general formula

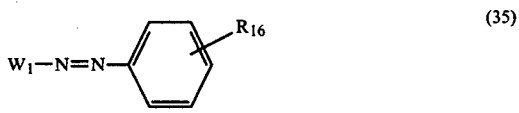 (34)

where T$_4$ has the meaning indicated above, R$_{16}$ is a —SO$_3$⊖, —CH$_2$SO$_4$⊖ or —HPO$_4$⊕ group and R$_{17}$ is hydrogen or an alkyl group having from 1 to 4 carbon atoms.

Suitable azo dyes are of the general formula $$W_1-N=N-\underset{\phantom{x}}{\bigcirc}-R_{16} \qquad (35)$$

where W$_1$ is an aromatic or heterocyclic group which comprises an active methylene group and R$_{16}$ is as just defined.

Preferably in the azo compounds of formula (35) R$_{16}$ is a —SO$_3$⊖ group. Also preferably in the azo compounds of formula (35) W$_1$ is a pyrazolone group or a hydroxypyridone group which are optionally further substituted by alkyl of 1 to 4 carbon atoms, preferably methyl and ethyl, cyano, hydroxy and/or substituted alkyl, such as —CH$_2$SO$_3$⊖. An example of such an azo dye is the pyrazolone-group containing azo dye of formula (39).

An example of such an azo dye where W$_1$ is hydroxypyridone is the azo dye of the formula

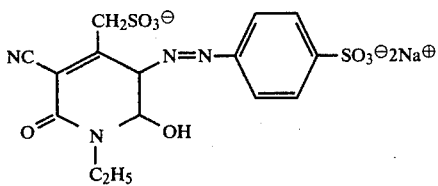 (36)

And phthalocyanine dye complexes of formula (24) where at least one of R is —$SO_3^{\ominus}$, there of course being no positively charged substituent group in the complex, as shown in formula (32).

Examples of $^{\oplus}A-(R_1)_{n3}-N=N-BAL$ are groups where $^{\oplus}A$ is a charged heterocyclic nucleus and $n_3$ is 0. For example the group of the formula

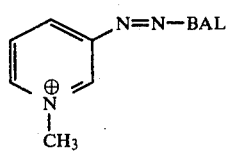 (37)

where BAL has the meaning assigned to it above. An example of such a compound is the compound of formula (26).

Other examples of $^{\oplus}A-(R_1)_{n3}-N=N-BAL$ are groups of the formula

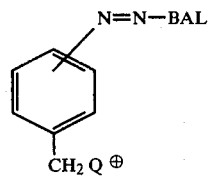 (38)

where $Q^{\oplus}$ is a quaternary ammonium, phosphonium or arsonium group and BAL has the meaning assigned to it above.

An example of such a compound is the compound of formula

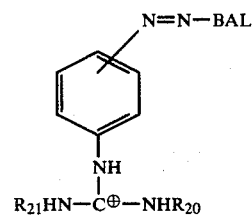 (39)

where BAL has the meaning assigned to it above and $R_{20}$ and $R_{21}$ are each hydrogen, alkyl groups having from 1 to 6 carbon atoms, or cycloalkyl of 5 or 6 carbon atoms.

An example of such a compound is the compound of formula (29).

Preferably BAL is the group of formula (10).

The compounds of formulae (1) and (2) are useful in a photographic process for the production of a photographic image which comprises imagewise exposing a photographic assembly which comprises a photosensitive system and associated therewith an azo compound of the general formulae (1) and (2), processing the exposed photographic assembly to produce an imagewise distribution of a reducing compound which is capable of reducing the azo compound, causing the reducing compound to reduce imagewise the azo compound, thereby liberating a diffusible dye and causing or allowing the diffusible dye to diffuse imagewise to a receiving layer and there to mordant the dye to form a dye image having a peak absorption within the range 300–800 nm.

It is to be understood that the photographic assembly may comprise more than one photosensitive system having associated therewith an azo compound of formulae (1) and (2).

The diffusible dye residue D is the residue of a preformed dye which after the azo compound has been reduced becomes a dye which is diffusible in the photographic assembly during processing. Thus the residue D has no ballasting substituents and may comprise solubilising groups in addition to the group comprising the charged residue of the dye. Examples of such solubilising groups may include hydroxy or amino groups, and sulphonamide or carboxylic acid groups.

EXAMPLE 1

1-Hydroxy-4-(3-sulphophenylazo)-2-naphth-[4-(2,4-ditertamylphenoxy)butyl]amide sodium salt Metanilic acid (1.73 g) was diazotised with sodium nitrite (0.7 g) in water (10 ml) and conc. hydrochloric acid (5 ml) and coupled with 1-hydroxy-2-naphth 4-(2,4-ditertamylphenoxy)butyl amide (4.74 g) in 2-methoxyethanol (20 ml) and potassium acetate (4.5 g). The precipitated dyestuff was filtered off.

The product has the formula

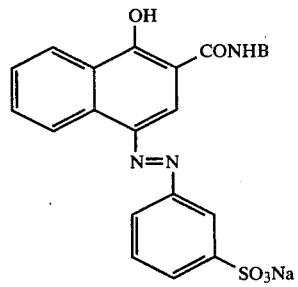 (40)

B has the meaning indicated above.

1-Hydroxy-4-(3-sulphophenylazo)-2-naphth-[4-(2,4-ditertamylphenoxy)butyl]amide-3,7-diamino-2,8-dimethyl-5-phenylphenazinium salt A solution of the azo dye of formula (40) (0.66 g) in 2-methoxyethanol was mixed with a solution of safranin 0 (0.36 g) in water, and the precipitated dyestuff filtered off. This is the compound of formula (13).

EXAMPLE 2

1-Hydroxy-4-(3-sulphophenylazo)-2-naphth-[4-(2,4-ditertamylphenoxy)butyl]amide-3,7-diaminophenothiazine-5-ium salt A solution of the azo dye of formula (40) (0.7 g) was mixed with thionine (0.27 g) as described in Example 1. The dark blue dyestuff was filtered off, and is the compound of formula (17).

EXAMPLE 3

1-Hydroxy-4-(3-sulphophenylazo)-2-naphth-[4-(2,4-ditertamylphenoxy)butyl]amide-3,6-diamino-10-methylacridinium salt Water was slowly added to a warm solution of acriflavine (0.3 g) and the azo dye of formula (40) (0.7 g) in ethanol. The orange precipitate was collected, and has m.p. 121°–124° C. This is the compound of formula (19).

EXAMPLE 4

1-Hydroxy-4-(3-sulphophenylazo)-2-naphth-[4-(2,4-ditertamylphenoxy)butyl]amide-9-(2-carboxyphenyl)-3,6-bis(diethylamino)xanthylium salt The azo dye of formula (40) (0.7 g) and Rhodamine B (0.48 g) were dissolved in boiling ethanol with the addition of a small amount of potassium hydroxide. The red solution was filtered into water, and the dye precipitated by addition of hydrochloric acid. This is the compound of formula (21), m.p. 219°–224° C.

EXAMPLE 5

1-Hydroxy-4-(3-pyridylazo)-2-naphth-[4-(2,4-ditertamylphenoxy)butyl]amide

3-Aminopyridine (2.35 g) was diazotised with sodium nitrite (1.73 g) in water (25 ml) and conc. hydrochloric acid (8.5 ml), and coupled with 1-hydroxy-2-naphth-4-(2,4-ditertamylphenoxy)butyl amide (11.89 g) in 2-methoxy ethanol (25 ml) and potassium acetate (10 g). The precipitated dyestuff was filtered off and recrystallised from acetic acid, m.p. 113°–116° C.

Copper phthalocyanine tetra-4-sulphonic acid-tetra-[3-(1-hydroxy-2-[4-(2,4-ditertamylphenoxy)-butyl]aminocarbonyl-4-naphthylazo)-1-methylpyridinium]salt The above azo dye (0.5 g) was heated with dimethylsulphate (0.6 ml) in isopropanol under reflux for 4 hours, to produce a solution of the compound of formula (26). This was slowly added to a solution of copper phthalocyanine tetrasulphonic acid sodium salt (0.25 g) in water. The precipitated dye-stuff was filtered off, and is the compound of formula (32).

EXAMPLE 6

1-(4-Sulphophenyl)-3-methyl-4-(4-sulphophenylazo)-pyrazol-5-one-bis-[3-(1-hydroxy-2-[4-(2,4-ditertamylphenoxy)butyl]-aminocarbonyl-4-naphthylazo)-1-methylpyridinium]salt The compound of formula (26) (prepared as above) was mixed with a solution of 1-(4-sulphophenyl)-3-methyl-4-(4-sulphophenylazo)pyrazolone in ethanol at reflux, and on cooling and diluting with water an orange solid was produced. This is the compound of formula (31), and has m.p. 121°–23° C.

EXAMPLE 7

3-Cyano-1-ethyl-6-hydroxy-4-sulphomethyl-5-(4-sulphophenylazo)pyrid-2-one mono [3-(1-hydroxy-2-[4-(2,2-ditertamylphenoxy)butyl]amino carbonylnaphth-4-ylazo)-1-methylpyridinium]-monosodium salt The compound of formula (26) (prepared as above) was mixed with a solution of 3-cyano-1-ethyl-6-hydroxy-4-sulphomethyl-5-(4-sulphophenylazo)pyrid-2-one sodium salt (prepared as described in B.P. 1,448,096) and an orange solid was produced.

EXAMPLE 8

1-Hydroxy-4-[4-aminophenylazo]-2-naphth-[4-(2,4-ditertamylphenoxy)butylamide]

A solution of 4-aminophenyldiazonium chloride (prepared from p-phenylene diamine (1.08 g) by the method described in the German Offenlegungsschrift 2,555,515) was coupled with a solution of 1-hydroxy-2-naphth-[4-(2,4-ditertamylphenoxy)butylamide] (4.75 g) and sodium acetate (2 g) in 2-methoxy ethanol (50 ml). The mixture was poured into water and the precipitated dye collected, washed and dried.

4-(4-Methoxyphenyl)azo-3-methyl-1-(4-sulphophenyl)-pyrazol-5-one N,N40
-dicyclohexyl-N''-[4-(1-hydroxy-2-4-(2,4-ditertamylphenoxy)butylamino carbonyl naphth-4-ylazo)phenyl]guanidinium salt A solution of the above azo dye (0.59 g) and dicyclohexyl carbodi-imide (0.21 g) was heated under reflux in ethanol for 2 hours, and then 4-(4-methoxyphenyl)azo-3-methyl-1-(4-sulphophenyl)pyrazol-5-one sodium salt was added, and the solid product collected, m.p. 211°–215° C.

I claim:

1. An azo compound of the formula

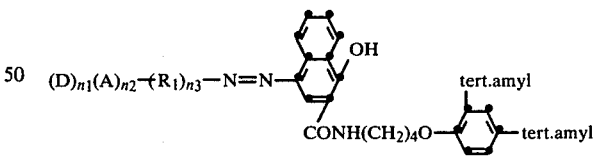

wherein A is quaternary ammonium, phosphonium or arsonium or guanidinium or is —SO$_3^\ominus$, HPO$_4^\ominus$ or —CH$_2$SO$_4^\ominus$, D is a diffusible dye which carries a charge opposite in sign to the charge carried by A, said dye being phthalocyanines, anthraquinones, azines, acridines, indigo dyes, oxonols, pyrylium, azo or azoxy dyes, R$_1$ is phenyl or pyridinyl or these radicals substituted by alkyl or alkoxy each of 1 to 4 carbon atoms, halogen or hydroxyl, R$_1$ is present unless A is pyridinium, n$_1$ and n$_2$ each are 1 or 2 and n$_3$ is 0 or 1.

2. An azo compound according to claim 1 of the formula

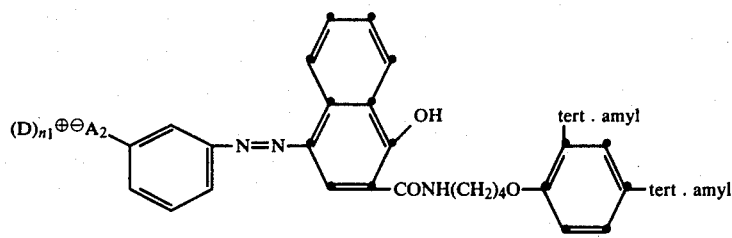

wherein $A_2^\ominus$ is $SO_3^\ominus$, $-CH_2OSO_3^\ominus$ or $-H-PO_4^\ominus$ and $D^\oplus$ is a positively charged diffusible dye of claim 1 and $n_1$ has the meaning indicated in claim 1.

3. An azo compound according to claim 2 wherein $D^\oplus$ is a basic dye of the formula

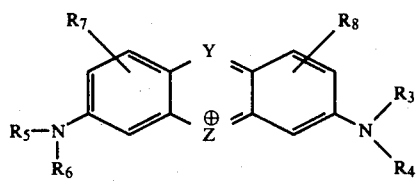

wherein Y is N or $CR_9$ is Z and $S^\oplus$, $O^\oplus$ or $NR_{10}^\oplus$ and each of $R_3$—$R_{10}$ are hydrogen, methyl, ethyl, phenyl or phenyl substituted by alkyl of 1 to 4 carbon atoms, halogen, hydroxy or carboxy, or $R_5$ and $R_6$ together with the nitrogen atom form an N heterocyclic 5- or 6-membered ring, or $R_7$ and $R_8$ represent the carbon atoms necessary to form an annelated benzene ring which is unsubstituted or substituted by the radicals identified above for phenyl.

4. An azo compound according to claim 2 where $D^\oplus$ is a basic dye of the formula

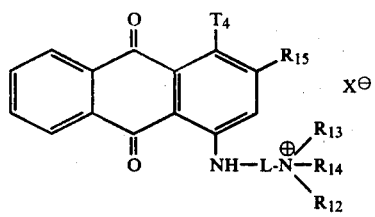

where $T_4$ is hydrogen, hydroxy, alkoxy of 1 to 4 carbon atoms, nitro or mono or di-alkyl ($C_1$-$C_4$) amino, $R_{15}$ is hydrogen, halogen, alkoxy of 1 to 4 carbon atoms, amino, mono- or dialkyl ($C_1$-$C_4$) amino; —COOH or —$SO_3H$, $R_{12}$, $R_{13}$ and $R_{14}$ are alkyl of 1 to 4 carbon atoms, phenyl or phenyl substituted by halogen, hydroxy, alkyl or alkoxy each of 1 to 4 carbon atoms, L is (—$CH_2$—)$_p$, wherein p is 1 to 10 and $X^\ominus$ is an anion.

5. An azo compound according to claim 2 wherein $D^\oplus$ is a basic phthalocyanine dye of the formula

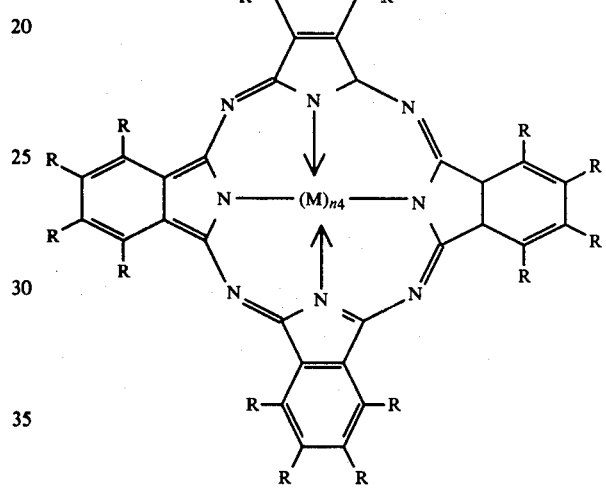

where M is copper, cobalt, nickel, iron, manganese, magnesium, zinc or barium and each R is hydrogen, $SO_3H$, $SO_3W$ where W is alkali metal, $n_4$ is 0 or 1, and at least one R has the formula L—$NR_{12}R_{13}R_{14}$ where $R_{12}$, $R_{13}$ and $R_{14}$ are alkyl of 1 to 4 carbon atoms, phenyl or phenyl substituted by halogen, hydroxy, alkyl or alkoxy each of one to 4 carbon atoms, L is (—$CH_2$—)$_p$; wherein p is 1 to 10.

6. An azo compound according to claim 2 where $A_2$ is —$SO_3^\ominus$.

7. An azo compound according to claim 1 of the formula

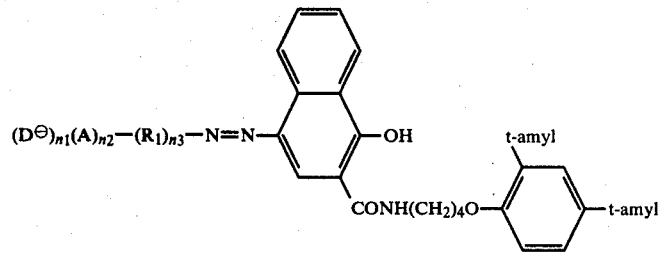

wherein $D^\ominus$, is a negatively charged diffusible dye of claim 1 and $n_1$ $n_2$, $R_1$ and $n_3$ have the meanings assigned to them in claim 1 and A is quaternary ammonium phosphonium or arsonium or guanidinium.

8. An azo compound according to claim 7 wherein D⊖ is an anthraquinone dye of the formula

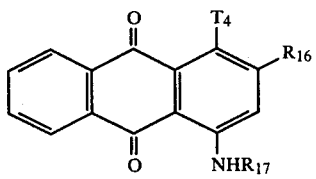

where $T_4$ is hydrogen, hydroxy, alkoxy of 1 to 4 carbon atoms, amino, or mono- or dialkyl ($C_1$-$C_4$), $R_{16}$ is —$SO_3^⊖$, —$CH_2SO_4^⊖$ or —$HPO_4^⊖$ and $R_{17}$ is hydrogen or alkyl having from 1 to 4 carbon atoms.

9. An azo compound according to claim 7 where D⊖ is an azo dye of the formula

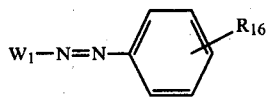

wherein $W_1$ is pyrazolone or hydroxy pyridone or these radicals substituted by alkyl of 1 to 4 carbon atoms, cyano, hydroxy and/or —$CH_2SO_3^⊖$ and $R_{16}$ is —$SO_3^⊖$, —$CH_2SO_4^⊖$ or —$HPO_4^⊖$.

10. An azo compound according to either claim 8 or claim 9 where $R_{16}$ is a —$SO_3^⊖$ group.

11. An azo compound according to claim 7 wherein D⊖ is a phthalocyanine dye of the formula

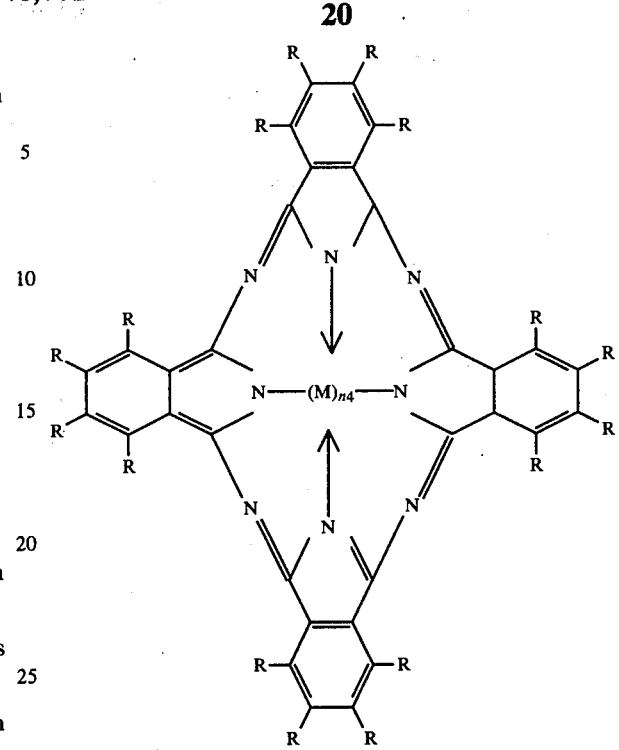

where M is copper, cobalt, nickel, iron, manganese, magnesium, zinc or barium, $n_4$ is zero or 1 and each R is hydrogen $SO_3^⊖$ $SO_3W$ where W is alkali metal but at least one R is —$SO_3^⊖$.

12. An azo compound according to claim 11 where from 2 to 4 of the R groups are —$SO_3^⊖$.

13. An azo compound according to claim 7 which contains the group

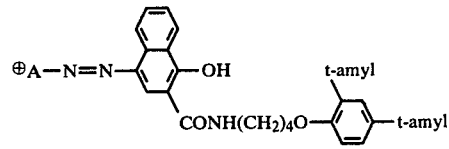

wherein A is the group of the formula

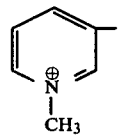

14. An azo compound according to claim 7 wherein the group $A^⊕$ is of the formula

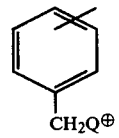

where $Q^⊕$ is a quaternary ammonium, phosphonium or arsonium group.

15. An azo compound according to claim 7 wherein the group A— is of the formula

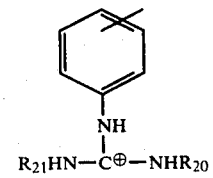

where $R_{20}$ and $R_{21}$ are each alkyl groups having from 1 to 6 carbon atoms or cycloalkyl of 5 or 6 carbon atoms.